United States Patent [19]

Milch

[11] Patent Number: 5,303,028

[45] Date of Patent: Apr. 12, 1994

[54] SPECTROMETER APPARATUS FOR CALIBRATING COLOR IMAGING APPARATUS

[75] Inventor: James R. Milch, Pittsford, N.Y.

[73] Assignee: Eastman Kodak Company, Rochester, N.Y.

[21] Appl. No.: 933,553

[22] Filed: Aug. 24, 1992

[51] Int. Cl.$^5$ ............................ G01J 3/28; H04N 1/46
[52] U.S. Cl. ...................................... 356/328; 356/404; 358/509
[58] Field of Search ............... 356/305, 328, 334, 404; 358/75, 406, 509

[56] References Cited

U.S. PATENT DOCUMENTS

| | | | |
|---|---|---|---|
| 3,664,741 | 5/1972 | Bonnet et al. | 356/300 |
| 4,285,596 | 8/1981 | Landa | 356/308 |
| 4,820,048 | 4/1989 | Barnard | 356/328 |
| 4,898,467 | 2/1990 | Milch | 356/328 |

Primary Examiner—F. L. Evans
Attorney, Agent, or Firm—David M. Woods

[57] ABSTRACT

Spectrometer apparatus for calibrating a color image scanner includes an opaque member, having an optical slit, movable into position on an optical axis of the scanner between its polychromatic light source and its lens in a plane occupied by a color image when it is scanned. A diffraction grating is similarly movable onto the optical axis between the slit and the lens. By having the grating in proximity to the slit, the opaque member and the grating can be part of a single assembly that can be easily moved into the optical axis in a convenient location near the scanning plane of the image scanner. The light source illuminates the slit and the diffraction grating disperses duplicate spectra off-axis across respective halves of the image sensor, from which data is obtained for calibration.

20 Claims, 2 Drawing Sheets

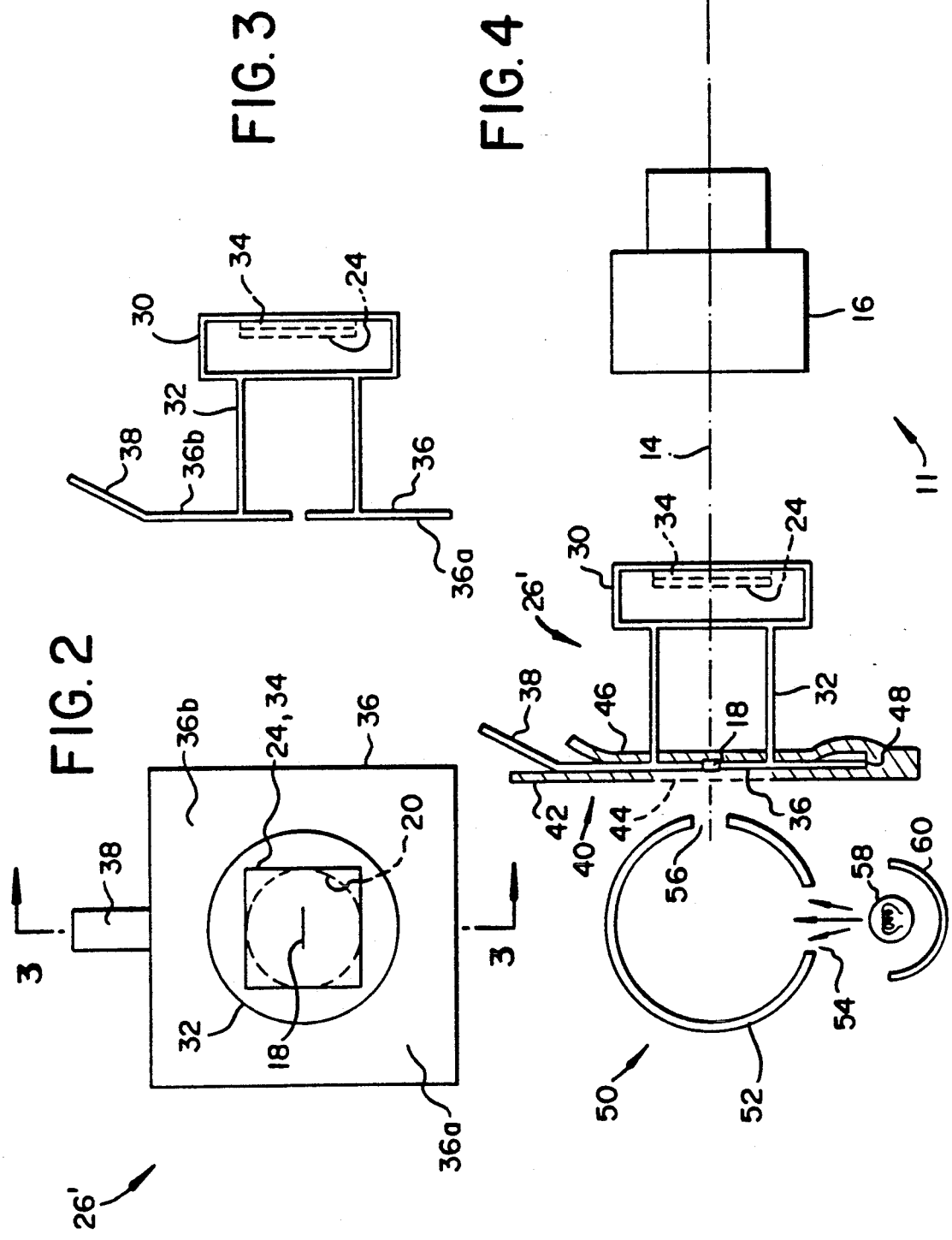

SPECTROMETER APPARATUS FOR CALIBRATING COLOR IMAGING APPARATUS

FIELD OF INVENTION

The present invention relates to Spectrometer apparatus for calibrating color imaging apparatus. More particularly, the invention relates to a spectrometer for calibrating a color film scanner.

BACKGROUND OF THE INVENTION

Color image scanning is a process of converting an image, recorded on either a transparency or a reflective print, to an electronic image. Scanning, as such, is commonly employed as a first step in the transmission of an image from one storage medium to another, or in the enhancement or the analysis of the image prior to its transmission.

With an image-bearing sheet held in a given plane, a color image scanner measures the optical density of the image by illuminating the sheet with polychromatic light. Commonly, a color image scanner measures the amount of light in a given color space, e.g. red (R), green (G), and blue (B), transmitted through, or reflected from, the image-bearing sheet. In doing so, the scanner effectively divides the image into discrete picture elements, or pixels, and assigns to each a number or value representing an average density for each color measured. Commonly, the pixels are arranged in rows and columns to form a two-dimensional grid with the density of each pixel corresponding to a relatively small portion of the overall image.

As is appreciated by those skilled in the image scanner art, calibrating the spectral sensitivity of a color image scanner is important to provide accurate reproduction of all colors in the image.

The spectral sensitivity of a color image scanner is determined by the spectral characteristics of a variety of scanner components such as the spectral content and sensitivity of its light source, the spectral transmissivity characteristics of filters, lenses and the like, and the spectral sensitivity of its image sensor. All of these factors, however, are likely to change, component to component, particularly with the use of a scanner over long periods of time. Furthermore, even with complete component stability, an original component may be replaced from time to time with a new component having a somewhat different characteristic.

A known technique for performing a calibration operation on a color film scanner is described in U.S. Pat. No. 4,898,467, which was issued in the name of James R. Milch to the assignee of the present invention, and which is expressly incorporated herein by reference. A spectrometer is disclosed for self-calibrating a color image scanner of the line scanner or area scanner type. It includes a member, having an optical slit, movable into position on an optical axis of the scanner between its polychromatic light source and its focusable lens in a plane occupied by a color image when it is scanned. A diffraction grating is similarly movable onto the optical axis between the focusable lens and an image sensor. The light source illuminates the slit and the diffraction grating disperses transmitted polychromatic light from the slit according to its wavelength, forming duplicate spectra off-axis across respective halves of the image sensor, with longer wavelengths being directed to respectively higher angles.

Each pixel of the image sensor receives an amount of light energy corresponding to its off-axis position, the repetition frequency of rulings of the grating, and the spectral sensitivity of the scanner itself. Accordingly, knowing the off-axis position of an image sensor pixel and knowing the grating frequency, the profile of light energy across the image sensor is a direct measure of the spectral response of the scanner. The calibrating of the color image scanner, based on its spectral response, can take place in signal processing electronics at the output of the image scanner.

While the Milch patent describes a calibrating system that has proved successful in certain applications, it nonetheless presents a problem in other applications where it is mechanically difficult to have an element, such as a diffraction grating, that is movable in and out of a position very near an image sensor.

SUMMARY OF THE INVENTION

The invention provides a solution to this problem with by a novel spectrometer design for measuring the spectral characteristics of color imaging apparatus of the type including a) a solid state image sensor having multiple pixels, and b) optical apparatus for projecting light from a color image along an optical axis in order to illuminate pixels of the image sensor. In particular, the spectrometer apparatus includes: a) a light source; b) a member, defining an optical slit, positionable on the optical axis between the light source and the optical apparatus substantially in a plane occupied by a color image when it is illuminated; and c) a diffraction grating positionable on the optical axis between the optical apparatus and the member in proximity to the optical slit to disperse light, transmitted by the optical slit, through the optical apparatus and onto the image sensor. The magnitude and the location of the light impinging upon the image sensor therefore varies as a function of the optical characteristics of the color imaging apparatus, including the spectral content of the light source and the spectral transmissivity characteristics of the optical apparatus and the image sensor.

While one advantage of the invention is that it is easier to place the diffraction grating between the color image plane and the lens, rather than nearby the sensor on the other side of the lens, an added advantage is that the closeness of the slit and the diffraction grating allows the slit-bearing member and the grating to be built as a single calibration assembly. This insures that the dimensions are very stable and simplifies insertion of the calibration assembly into the color imaging apparatus. Furthermore, the assembly can be constructed such that it is particularly easy to maintain correct orientation of the slit and grating in the color imaging apparatus.

BRIEF DESCRIPTION OF THE DRAWINGS

The invention will be described in relation to the drawings, in which:

FIG. 2 is a front view of a calibration fixture including an optical slit and a diffraction grating in accordance with the present invention;

FIG. 3 is a side elevation of the calibration fixture shown in FIG. 2 as taken along the line 3—3; and FIG. 4 is a schematic of a preferred embodiment of the spectrometer apparatus in accordance with the present invention.

DESCRIPTION OF THE PREFERRED EMBODIMENTS

Figure 1:
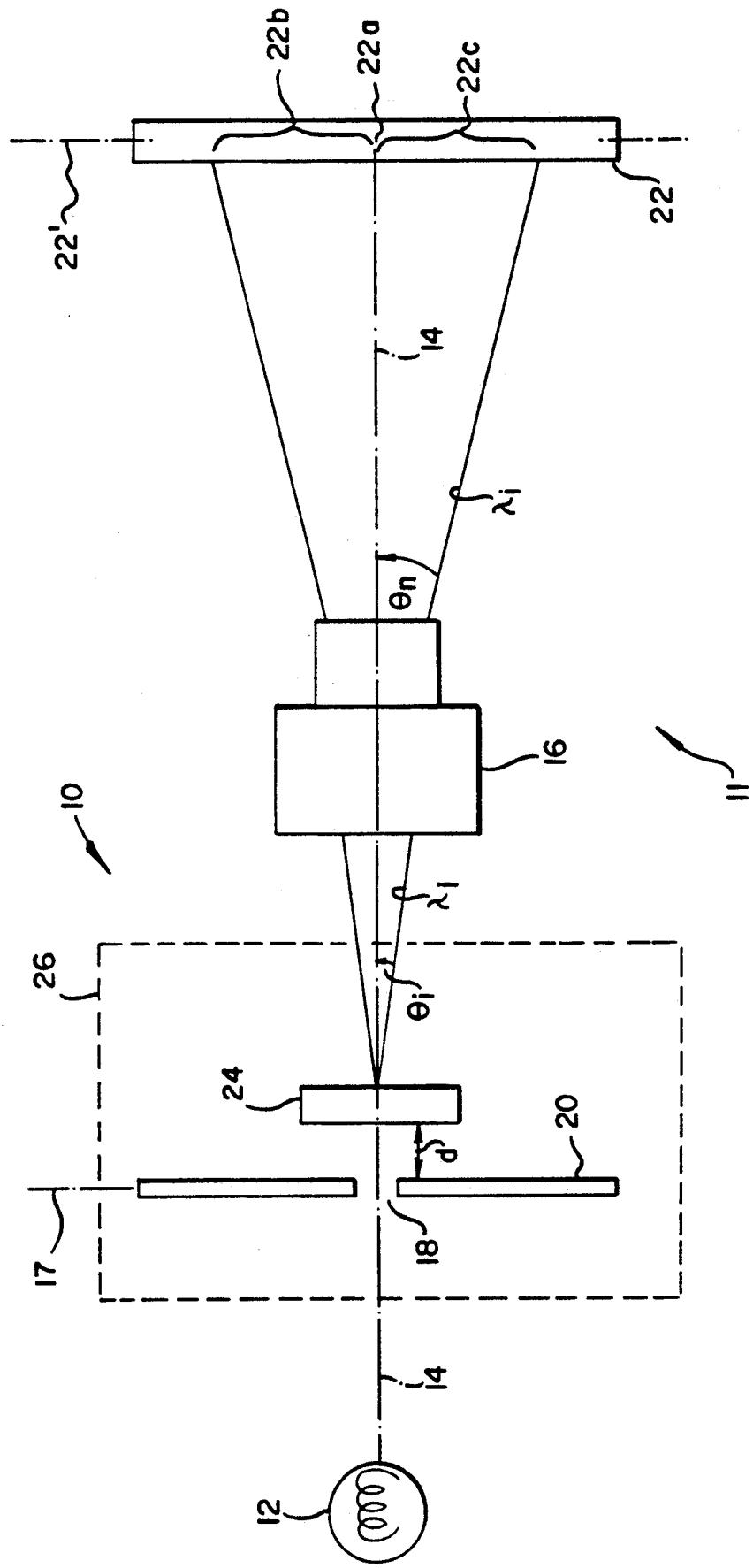
FIG. 1 is an optical schematic of spectrometer apparatus in accordance with the present invention.

FIG. 1 illustrates generally spectrometer apparatus 10 in use with a color imaging apparatus 11 in accordance with the present invention. A source 12 serves for projecting polychromatic light along the optical axis 14. A focusable lens 16 images a relatively narrow slit 18 (which is not drawn to scale in the Figures) of a member 20 onto a linear image sensor 22. To that end, the slit 18 is orthogonal to the axis 22' of the image sensor 22 and, as shown, is positioned in an object plane 17 of the lens 16. (The object plane 17 is also the scanning plane in which an image bearing sheet is located during the scanning mode of the apparatus.)

The light source 12 illuminates the slit 18. In view of its narrow breadth and location in the object plane, the slit 18 is imaged through the lens 16 generally onto only an on-axis pixel location 22a of the image sensor 22. A diffraction grating 24, however, located a given distance d from the slit 18 disperses the light according to its constituent wavelengths. After passing through the lens 16, the dispersed light forms duplicate spectra (rainbows) across both halves of the image sensor (on either side of the optical axis 14) with progressively longer wavelengths being diverted through progressively larger angles.

The pixel locations of the image sensor 22 receive an amount of light energy corresponding to their off-axis positions, the repetition frequency of rulings of the diffraction grating 24, the spectral content of the light, and the magnification of the lens 16. More specifically, the diffraction grating 24 disperses light energy into the lens 16 according to:

$\sin \theta_i = \lambda_i f$ where f is the repetition frequency of the grating.

These wavelengths are then further dispersed through a total angle $\theta_n$ by the magnification power of the lens 16.

Preferably, the grating 24 is a phase grating, particularly a "blazed" phase grating in which most of the light is sent to a particular diffraction order. Suitable "blazed" phase gratings are commonly available catalog items. (In the absence of "blazing", half of the power is directed to the central pixel location and most of the remaining power is distributed equally in the first order spectrum on either side of the central location. By "blazing" the grating, substantially all first order power is directed toward one side of the central location. This increases signal-to-noise and improves the ability of the processing electronics (not shown) to detect the wavelength distribution sensed by the imager 22.) Another type of grating is an amplitude grating, commonly called a Ronchi ruling, made of clear glass or clear plastic with alternating clear and opaque bars of equal width. A Ronchi ruling grating can be made by depositing chrome on glass or it can be made by contact printing a master onto a photographic emulsion.

In operation, one-half of the total light incident on the sensor 22 forms an image of the slit 18 on the on-axis pixel location 22a. The main beam—"on-axis" light—provides a convenient reference point for measuring the off-axis position of diffracted light. For an amplitude grating, most of the other half of the incident light (the diffracted light) is split equally between two first-order spectra 22b and 22c formed, respectively, across opposing halves of the image sensor 22. (A small amount of incident light energy is diffracted into corresponding pairs of higher order spectra (not shown) at progressively greater distances from the axis 14.) For the preferred phase grating, most of the other half of the incident light energy is concentrated into the first order spectr, e.g., 22c, on one side only of the center location 22a.

FIG. 1 further illustrates an important advantage of the invention: by placing the diffraction grating 24 proximate to the slit 18 and between the object (image bearing sheet) plane 17 and the lens 16, the grating 24 and the slit 18 may be part of single assembly 26 (shown generally in broken line in FIG. 1.) In this connection, the slit 18 would be a very small opening in e.g., a metal portion toward one end of the assembly 26 and the diffraction grating 24 could be supported at the opposing end a distance d from the slit 18. This establishes the distance d as a fixed part of the assembly 26 and greatly simplifies the insertion of the slit 18 and the grating 24 into the color imaging apparatus 11. The distance d between the grating 24 and the slit 18 is important because it determines where the first diffraction order will appear on the lens 16 and therefore where it will appear on the sensor 22.

A preferred embodiment of the assembly 26 is shown in frontal view in FIG. 2 as a small, hand-inserted fixture 26'. Referring also to the side elevation of FIG. 3, the diffraction grating 24 is inset into a mounting 30 attached to one end of a hollow cylindrical member 32. A cylindrical member 32 is of a generally tubular shape, and has a generally axial extension along the optical axis. A protective glass 34 covers and protects the diffraction grating 24. The member 20 is a sheet of stainless steel or like opaque material inset into a plate 36 mounted to the other end of the hollow member 32. The slit 18 may be formed by known techniques, such as laser cutting of the steel member 20. (The hollow member 32 happens to be an opaque cylinder but other shapes are possible, and, although desirable, opacity is not strictly necessary.) The plate 36 has portions generally shown as 36a and 36b (in FIG. 2) which extend in a generally perpendicular direction from the axis of the hollow member 32 to provide surfaces for manually holding the fixture 26' and for engaging a film gate (to be shown). In addition, a tab 38 extends from the plate 36 for manual (hand) engagement by an operator.

FIG. 4 shows a preferred embodiment of the invention in which the fixture 26' is inserted into a film gate 40 and the light striking the slit 18 is generated by a diffuse source 50. The film gate 40 includes a base plate 42 having an aperture 44, and flexures 46 for sandwiching the outwardly extending areas 36a and 36b of the plate 36 against the base plate 42. The film gate 40 also has a stop 48 for referencing at least one edge of the plate 36, and thereby aligning the slit 18 properly with respect to the optical axis 14. It is further noted that the tab 38, located on the plate 36, is so positioned relative to the fixture 26' and the film gate 40 that the fixture 26' slides into the gate 40', and therefore into the optical path 14, in only one (correct) orientation.

The diffuse source 50 includes an integrating volume 52, which has an entrance port 54 and an exit slot 56. Specular rays from a lamp 58, either direct or reflected from a reflector 60, enter the entrance port 54 and reflect from the walls of the volume 52. To diffuse the received light, the inside walls are preferably painted with a diffuse, highly reflective paint. Light diffused by such reflections exits through the slot 56 as a line of diffuse radiation and impinges directly upon the slot 18. Diffuse light is not essential for the spectrometer apparatus but is useful to minimize the effect of dirt and scratches when a transparent color image is disposed in the gate 40 for image scanning. Preferably, light from a number of directions strike the slit 18 so that a cone of light will fill the grating 24. Although the type of color image scanning is not of particular importance in connection with the spectrometer apparatus, the scanning may nonetheless be obtained in a number of ways, including movement of the film gate 40 past the line of diffuse light exiting the slot 56.

While the invention has been disclosed for use with a transmission scanner, it could be used, with suitable modifications clear to those skilled in these arts, with a reflection scanner. In that case the light source would be positioned on the opposite side of the film gate to direct light toward the gate 40, and the image light would be reflected back to the lens 16. The slit 18 could be a narrow reflective surface set against a non-reflective, opaque background.

Calibration of the color imaging apparatus is a well-known process described in the aforementioned Milch patent (U.S. Pat. No. 4,898,467), which has been incorporated by reference into this disclosure. Such techniques may be understood by reference to the Milch patent and from the general knowledge in the art of color calibration.

The invention has been described in detail with reference to particular embodiments shown in the Figures; however, it will be appreciated that variations and modifications are possible within the spirit and scope of the invention.

What is claimed is:

1. Spectrometer apparatus for measuring the spectral characteristics of color imaging apparatus of the type including a solid state image sensor, having multiple pixels, and optical apparatus for projecting light from a color image along an optical axis for illuminating pixels of the image sensor, said spectrometer apparatus comprising:
   a light source;
   a member, defining an optical slit, positionable on the optical axis between said light source and the optical apparatus substantially in a plane occupied by a color image when it is illuminated; and
   a diffraction grating positionable on the optical axis in proximity to the optical slit, between the optical apparatus and said member, to disperse light transmitted by the optical slit through the optical apparatus and onto the image sensor, the magnitude and the location of the light impinging upon the image sensor varying as a function of the optical characteristics of the color imaging apparatus including the spectral content of said light source and the spectral transmissivity characteristics of the optical apparatus and the image sensor.

2. Spectrometer apparatus as claimed in claim 1 wherein said light source produces diffuse illumination.

3. Spectrometer apparatus as claimed in claim 2 wherein said light source includes an integrating volume having an exit slot for imaging a line of diffuse illumination upon said member.

4. Spectrometer apparatus as claimed in claim 1 wherein said member and said diffraction grating are part of a single assembly positionable on the optical axis.

5. Spectrometer apparatus for measuring the spectral characteristics of color imaging apparatus of the type including a light source for illuminating a transparent color image, a solid state image sensor having multiple pixels, and optical apparatus for projecting light transmitted through the color image along an optical axis for illuminating pixels of said image sensor, said spectrometer apparatus comprising:
   a diffraction grating positionable on the optical axis to disperse light through the optical apparatus and onto the image sensor;
   a member, defining an optical slit, positionable on the optical axis substantially in a plane occupied by the color image when it is illuminated, to image a slit of light onto said grating; and
   means for commonly supporting said member and said diffraction grating such that they are positionable as a unit in the optical axis, whereby the magnitude and the location of the light impinging upon the image sensor varies as a function of the optical characteristics of the color imaging apparatus including the spectral content of said light source and the spectral transmissivity characteristics of the optical apparatus and the image sensor.

6. Spectrometer apparatus as claimed in claim 5 wherein said diffraction grating is a "blazed" grating producing a zeroth order and at least a first order spectra, and the predominant power of the first order spectra is substantially directed to one side of the zeroth order.

7. Spectrometer apparatus for calibrating a color image scanner of the type having a light source for illuminating a color image to be scanned, a solid state image sensor having multiple pixels, and a lens for projecting light transmitted through the color image along an optical axis for illuminating pixels of said image sensor, said spectrometer apparatus comprising:
   a gate for supporting the color image in a scanning plane;
   a member, defining an optical slit, positionable on the optical axis between the light source and the lens in substantial alignment with the scanning plane;
   a diffraction grating positionable on the optical axis between the lens and said member to disperse light, transmitted by the optical slit of said member, through the lens and onto the image sensor; and
   a fixture for supporting said member and said diffraction grating in fixed relation to each other such that, during a calibration mode of operating, they are positionable as a unit by insertion of said fixture into said gate,
   whereby the magnitude and the location of the light impinging upon the image sensor varies as a function of the optical characteristics of the color imaging apparatus including the spectral content of said light source and the spectral transmissivity characteristics of the optical apparatus and the image sensor.

8. Spectrometer apparatus as claimed in claim 7 wherein said fixture comprises a generally tubular section having an axial extension along the optical axis, and having said member and said diffraction grating mounted at opposite ends thereof.

9. Spectrometer apparatus as claimed in claim 7 wherein said gate includes means for holding the fixture.

10. Spectrometer apparatus as claimed in claim 7 wherein said fixture is a hollow, opaque light guide.

11. Spectrometer apparatus as claimed in claim 10 wherein said slit-defining member is supported on a plate at one end of the fixture.

12. Spectrometer apparatus as claimed in claim 11 wherein said plate has portions extending outwardly from the outer dimensions of the light guide.

13. Spectrometer apparatus as claimed in claim 12 wherein said outwardly extending portions of the plate are dimensioned so as to fit into the gate.

14. Spectrometer apparatus as claimed in claim 13 wherein said gate includes flexures for engaging the outwardly extending portions of the plate and thereby holding the slit-defining member in the scanning plane.

15. Spectrometer apparatus as claimed in claim 13 wherein said plate includes a tab for manually positioning the fixture into the gate.

16. Spectrometer apparatus as claimed in claim 15 wherein the tab is so positioned on the fixture relative to the gate that the fixture may be inserted in only one orientation into the gate.

17. A calibration fixture for insertion into the optical axis of a film scanner during a calibration mode of operation, said film scanner including a source of illumination and a film gate for supporting a color image in a scanning plane illuminated by the source during a scanning mode of operation, said fixture comprising:

a hollow member having a lengthwise dimension that generally aligns with the optical axis during the calibration mode of operation;

a plate mounted generally perpendicular to one end of the hollow member, said plate having extensions for supporting the fixture in the film gate during the calibration mode of operation;

an optical slit formed in the plate and aligned generally with the optical axis during the calibration mode of operation; and a diffraction grating supported at the other end of the hollow member, whereby the fixture is inserted into the film gate in place of the color image during the calibration mode of operation such that the slit generally occupies the scanning plane and the diffraction grating disperses light transmitted by the slit.

18. A calibration fixture as claimed in claim 17 wherein the plate extensions include a tab for manually inserting and removing the fixture from the film gate.

19. A calibration fixture as claimed in claim 18 wherein the positioning of the tab guarantees only one way of inserting the fixture into the film gate.

20. A calibration fixture as claimed in claim 17 wherein the diffraction grating is a phase grating.

* * * * *